United States Patent
Mantovani et al.

[19]

[11] Patent Number: 5,918,693
[45] Date of Patent: Jul. 6, 1999

[54] INDUSTRIAL TRUCK WITH A HEIGHT-ADJUSTABLE STANDING AND/OR SITTING PLATFORM

[75] Inventors: Guiseppe Mantovani, Suzzara; Gianfranco Andreoli, Rolo; Gianni Passeri, Virgilio, all of Italy

[73] Assignee: Fiat Om Carelli Elevatori S. p. a., Italy

[21] Appl. No.: 08/807,727

[22] Filed: Feb. 28, 1997

[30] Foreign Application Priority Data

Mar. 1, 1996 [DE] Germany ............... 196 07 969

[51] Int. Cl.⁶ .................................................. B62D 33/06
[52] U.S. Cl. .......................... 180/89.13; 296/190.04
[58] Field of Search ................. 180/89.13, 89.15, 180/89.16; 182/141, 148; 296/190.04

[56] References Cited

U.S. PATENT DOCUMENTS

| | | | |
|---|---|---|---|
| 3,963,132 | 6/1976 | DuFour | 214/142 |
| 4,018,473 | 4/1977 | Chalupsky | 296/28 C |
| 4,427,090 | 1/1984 | Fredriksen et al. | 180/327 |
| 4,463,818 | 8/1984 | Sonneborn | 180/89.15 |
| 4,630,700 | 12/1986 | Larsson | 180/89.13 |
| 5,199,193 | 4/1993 | Akiba et al. | 37/341 |
| 5,732,370 | 3/1998 | Boyle et al. | 701/37 |

FOREIGN PATENT DOCUMENTS

| | | | |
|---|---|---|---|
| 9300762 | 3/1993 | Germany | B62D 25/20 |
| 4413630 | 10/1995 | Germany | B62D 33/06 |

*Primary Examiner*—Christopher P. Ellis
*Attorney, Agent, or Firm*—Webb Ziesenheim Logsdon Orkin & Hanson, P.C.

[57] ABSTRACT

An industrial truck has a height-adjustable standing and/or sitting arrangement for an operator and steering hydraulics. The standing and/or sitting arrangement is connected with a hydraulic positioning cylinder, which is connected to the steering hydraulics for the height adjustment of the standing and/or sitting arrangement. The positioning cylinder is connected in parallel with a steering motor and can be acted upon from both sides by the steering hydraulics. An electromagnetically actuatable valve, which can be controlled by a control unit, is disposed in a hydraulic line leading to a positioning space of the positioning cylinder associated with the upward movement of the height adjustment. The control unit prevents height adjustment if another work function is being executed by the industrial truck.

18 Claims, 3 Drawing Sheets

INDUSTRIAL TRUCK WITH A HEIGHT-ADJUSTABLE STANDING AND/OR SITTING PLATFORM

BACKGROUND OF THE INVENTION

1. Field of the Invention

This invention relates to an industrial truck with a height-adjustable standing and/or sitting arrangement for an operator and with steering hydraulics.

2. Description of the Prior Art

The height-adjustability of the standing and/or sitting arrangement of an industrial truck serves to improve its ergonomics. Thus, the workplace of the operator may be optimally adapted to body size. Since an industrial truck is a work machine which serves as a workplace for many hours, good ergonomics is important for fatigue-free work and thus for maximum productivity.

Prior art adjustment mechanisms have expensive designs and are frequently awkward to manipulate, such that the adjustment capability is often not used.

It is, therefore, an object of the present invention to provide an industrial truck having a low cost arrangement for adjusting the height of the standing and/or sitting arrangement. It is also an object of the present invention to provide an industrial truck having an arrangement for adjusting the height of the standing and/or sitting arrangement that is simple and quick to use.

SUMMARY OF THE INVENTION

Accordingly, we have invented an industrial truck having a standing and/or sitting arrangement that is connected to a hydraulic positioning cylinder. The hydraulic positioning cylinder is connected to steering hydraulics of the industrial truck. The steering hydraulics are utilized to adjust the height of the standing and/or sitting arrangement.

In an embodiment of the invention, the steering hydraulics have a pump, a steering motor and a control device connected therebetween. A connecting line is connected from the control device to one side of the steering motor and another connecting line is connected from the control device to another side of the steering motor. Branch connecting lines connect the positioning cylinder in parallel with the steering motor. A switchable valve is disposed in one of the branch connecting lines. When the switchable valve is brought into a position in which hydraulic fluid intake or discharge is possible, activation of a steering member of the industrial truck, i.e., rotational movement of the steering wheel, activates the height adjustment of the standing and/or sitting arrangement. The branch connecting lines that supply hydraulic fluid to the positioning cylinder determine whether the switchable valve acts as intake control or discharge control. Moreover, depending on the direction of rotation of the steering wheel, the standing and/or sitting arrangement moves up or down.

The switchable valve is preferably an electromagnetically actuatable directional-control valve with a feedthrough setting and a closed setting. The switchable valve can be controlled by a control unit. The control unit is connected to a position signal generator for controlling the height adjustment and to control signal generators and control devices for work functions of the industrial truck.

The control unit precludes height adjustment of the standing and/or sitting arrangement during specific operational states, thereby providing protection against erroneous operation. Specifically, the control unit is preferably connected to the switchable valve, the control signal generators and the control devices of the work functions such that in the presence of a control signal for a work function followed by input of a positioning signal for the height adjustment, the valve cannot be moved to the open position. Moreover, in the presence of a positioning signal for the height adjustment followed by input of a control signal for a work function, the work function is blocked at least until termination of the height adjustment. Hence, height adjustment can occur only if another function is not being performed at the same time. This precludes adjustment of the height of the standing and/or sitting arrangement while the industrial truck is being driven. Conversely, work functions, e.g., the starting of the industrial truck, are enabled only when a previously initiated height adjustment is completed. The control unit thus gives the first incoming signal priority relative to the execution of the desired command.

Preferably, the hydraulic pressure in the positioning cylinder required for height adjustment is less than the hydraulic pressure applied in the steering of the stationary industrial truck and is greater than the hydraulic pressure applied in the steering of the traveling industrial truck. Hence, when the industrial truck is stationary, the steered wheels are prevented from being moved during the height adjustment, thus prematurely wearing the wheels as a result of turning in place. Moreover, when the industrial truck is traveling and the valve opens due to, for example, a defect or is stuck in the open position after previous activation, the steering has priority and the height adjustment remains out of operation. The steering function is thus always guaranteed when the vehicle is traveling.

A pressure regulator such as, for example, a throttle, is disposed in the same branch connecting line as the switchable valve, preferably the branch connecting line which leads to the positioning space of the positioning cylinder which is associated with the upward movement of the height adjustment.

An advantage of the present invention is that the height of the standing and/or sitting arrangement of an industrial truck is adjustable utilizing hydraulics, preferably steering hydraulics, already present on the industrial truck. Another advantage of the present invention is that the height of the standing and/or sitting arrangement is quickly and easily adjustable by rotational movement of the steering wheel. Still other advantages will become apparent to others upon reading and understanding the following detailed description.

DETAILED DESCRIPTION OF THE PREFERRED EMBODIMENT

Figure 1:
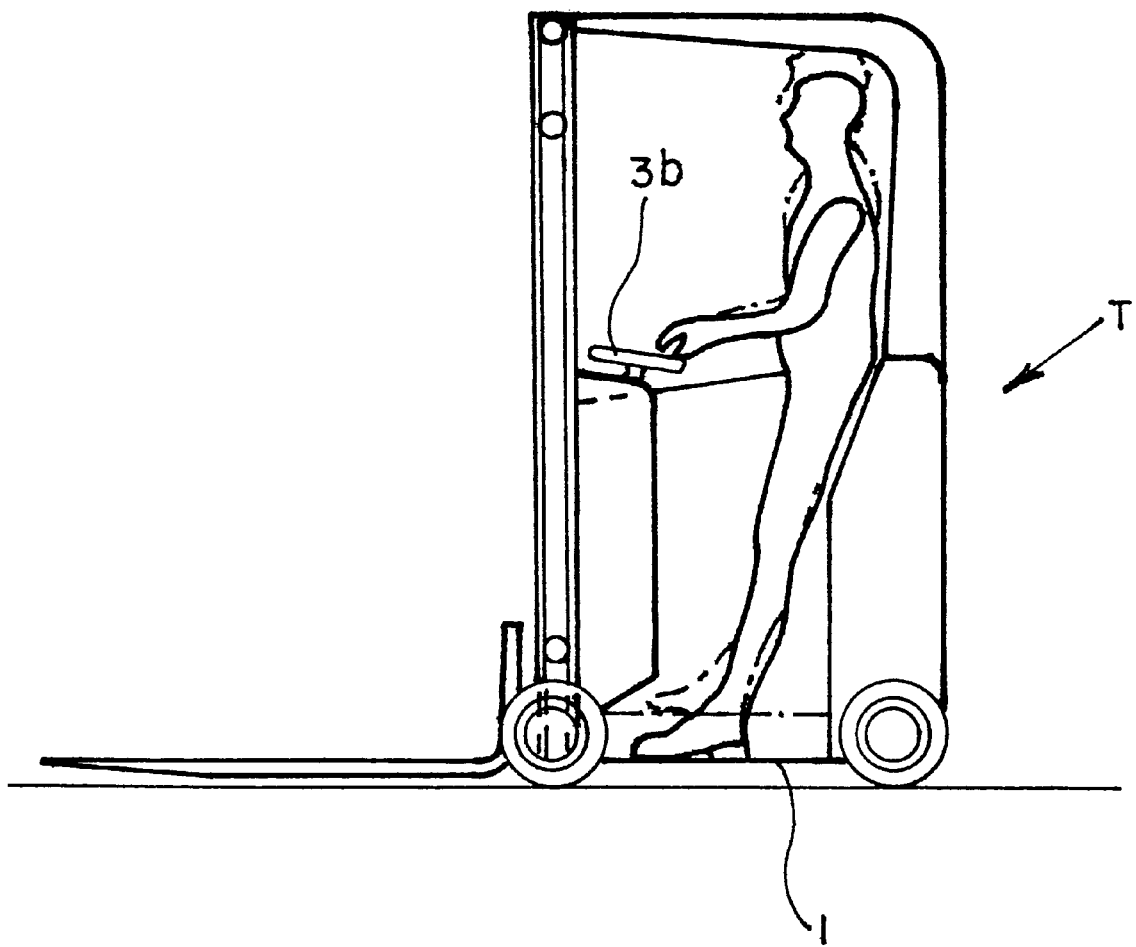
FIG. 1 is a side view of an industrial truck according to the invention to be driven by a standing driver.

With reference to FIG. 1, an industrial truck T is designed with a standing platform 1 as the driver's position. The standing platform 1 is height-adjustably attached in the industrial truck T.

Figure 2:
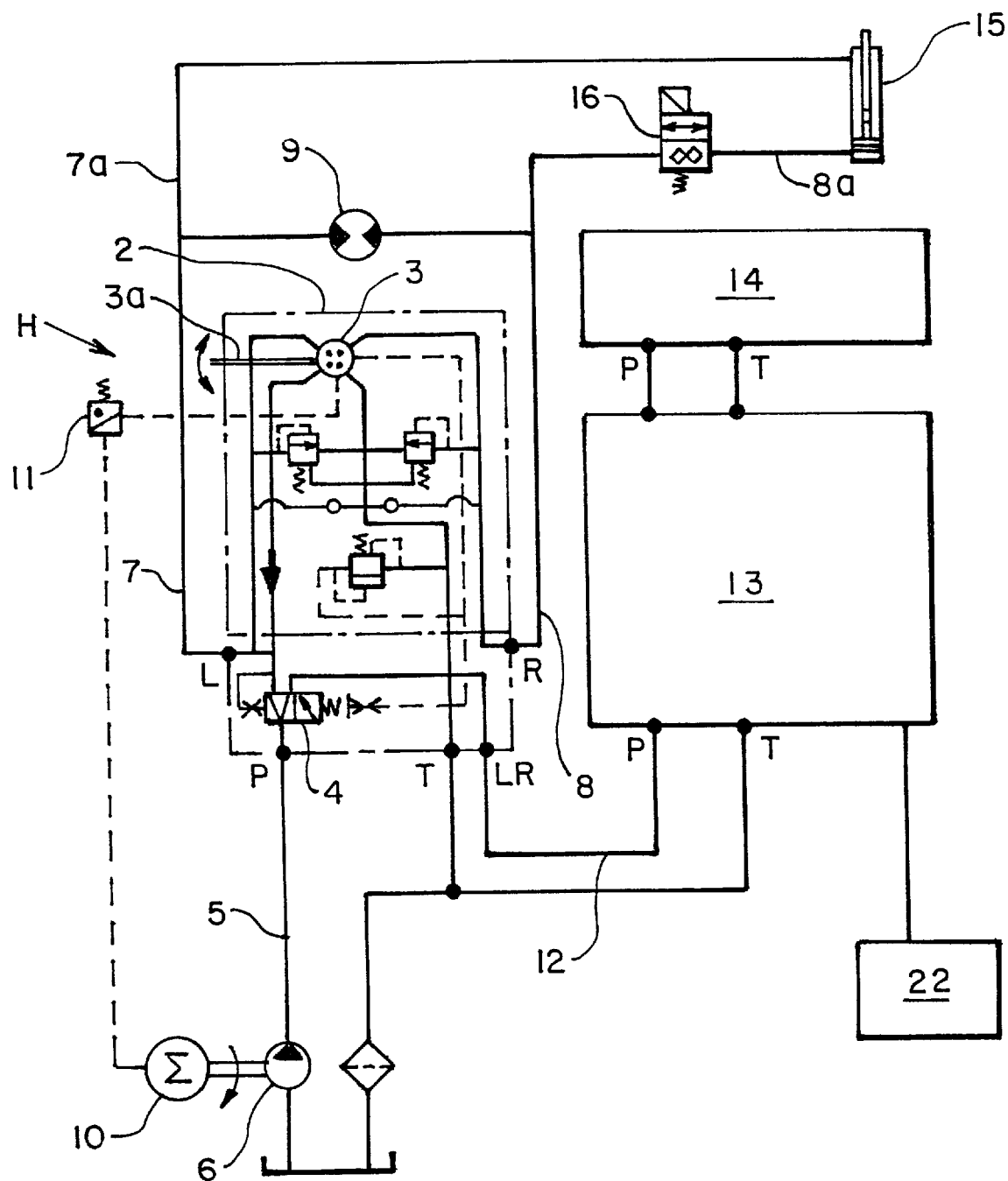
FIG. 2 is a hydraulic circuit diagram of the industrial truck according to the invention.

With reference to FIG. 2 and with continuing reference to FIG. 1, the industrial truck T includes a hydraulic system such as steering hydraulics H that is comprised of controller 2, feed pump 6, steering motor 9, and electric motor 10. The controller 2 has a steering metering pump 3 and a priority valve 4. The priority valve 4 is connected on its intake side to a delivery line 5 of the feed pump 6 (connection P). Outputs of the priority valve 4 are provided to the steering metering pump 3 and to a connection LR of the controller 2. A steering column 3a including a steering wheel 3b on an end thereof is attached to the steering metering pump 3. The discharge side of the steering metering pump 3 is connected to connections L and R. One side of the steering motor 9 is connected to connection L via connecting line 7 and the other side of steering motor 9 is connected to connection R via connecting line 8.

A line 12 extends between the connection LR of the controller 2 and working hydraulics 13 and braking hydraulics 14. The feed pump 6 is driven by the electric motor 10, which may be turned on and off by a switch 11 actuatable through the steering metering pump 3. The priority valve 4 supplies the steering metering pump 3 with hydraulic oil when the working hydraulics 13 and/or braking hydraulics 14 are activated simultaneously with the steering hydraulics H.

The standing platform 1 is connected to a positioning cylinder 15, which is connected with the steering hydraulics H. More specifically, one side of the positioning cylinder 15 is connected to connecting line 7 via branch connecting line 7a and the other side of the positioning cylinder 15 is connected to connecting line 8 via branch connecting line 8a. Hence, the positioning cylinder 15 is connected in parallel with the steering motor 9 and, therefore, can be acted upon from both sides. An electromagnetically actuatable directional-control valve 16 with a closed setting and a feedthrough setting is disposed in the branch connecting line 8a. When inactive, the directional-control valve 16 defaults to the closed setting. In the embodiment of FIG. 2, the branch connecting line 8a leads to a positioning space of the positioning cylinder 15 which is associated with the upward movement of the height adjustment.

When the directional-control valve 16 is activated, so that the directional-control valve 16 is in the feedthrough setting, actuation of the controller 2, i.e., by turning the steering wheel 3b, supplies the positioning cylinder 15 with hydraulic oil thereby activating the height adjustment of the standing platform 1 in the desired direction. Thus, for example, turning the steering wheel 3b clockwise adjusts the height of the standing platform 1 upward and turning the steering wheel 3b counterclockwise adjusts the height of the standing platform downward.

The pressure in the positioning cylinder 15 required for height adjustment is preferably less than the pressure applied in the steering motor 9 during steering of the stationary vehicle. This prevents the steered wheels from being moved during the height adjustment of the standing platform 1 when the vehicle is stationary, thus wearing the wheels prematurely as a result of turning in place. Moreover, the pressure in the positioning cylinder 15 required for height adjustment is preferably greater than the pressure applied in the steering motor 9 during steering of the traveling industrial truck. This prevents height adjustment of the standing platform 1 when the industrial truck T is traveling. Hence, if the directional-control valve 16 is opened when the industrial truck is traveling, i.e., due to a defect, or is stuck in the open position after a previous actuation, steering has priority and the height adjustment remains out of operation. Consequently, the steering function is always guaranteed while the vehicle is traveling.

Figure 3:
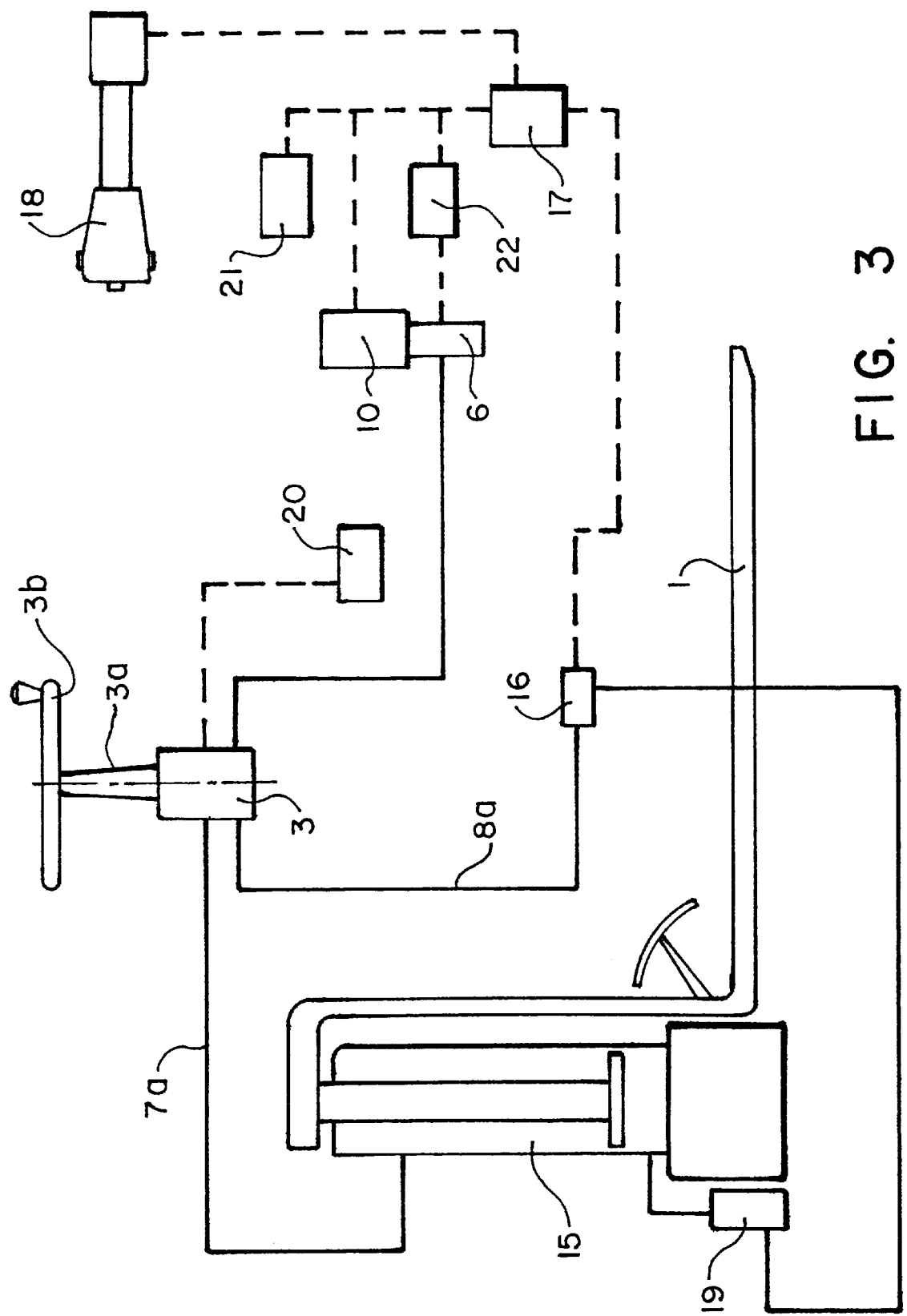
FIG. 3 is a diagrammatic illustration of the height adjustment of the standing and/or sitting arrangement.

With reference to FIG. 3, and with continuing reference to FIG. 2, a pressure regulator 19, for example, a throttle, is disposed in one of the branch connecting lines 7a or 8a, preferably branch connecting line 8a. The pressure regulator 19 regulates the pressure in the positioning cylinder 15 to a specific value to obtain desired adjustment of the height of the standing platform 1. The pressure regulator 19 also limits the pressure in branch connecting line 8a to a maximum desirable pressure thereby serving as a permanently active safety. An additional safety arrangement or regulator 20 may be utilized to monitor and/or limit the pressure of the hydraulic fluid supplied to the steering metering pump 3.

The directional-control valve 16 is connected to a control unit 17. The control unit 17 is also connected to a position signal generator 18 for the height adjustment and to control signal generators 21 and control devices 22 for work functions of the industrial truck, for example, from the area of the working hydraulics or the vehicle drive. The control signal generators 21 and the control devices 22 provide one or more control signals to the control unit 17 when the industrial truck is performing one or more work functions. The control unit 17 precludes height adjustment of the standing and/or sitting arrangement in certain operational states, and thus protects against erroneous operation. Preferably, the control unit 17 automatically precludes height adjustment.

More specifically, the control unit 17 prevents the directional-control valve 16 from changing to the open position when a control signal for a work function is provided thereto, from the control signal generators 21 or the control devices 22, in advance of a signal to adjust the height of the standing platform 1. Moreover, the control unit 17 prevents work functions from being performed during the height adjustment when a signal to adjust the height of the standing platform 1 is received by the control unit 17 in advance of a control signal from the control signal generators 21 or the control devices 22. Thus, height adjustment may only occur if another work function is not being executed at the same time. This precludes height adjustment of the standing platform 1 while the vehicle is traveling. Similarly, work functions, e.g., the starting of the vehicle, are not enabled until a previously initiated height adjustment has been completed. The control unit 17 thus gives priority to the first incoming signal with regard to the execution of the desired command.

Obviously, the invention is applicable not only to the height adjustment of a standing platform 1 but also to the height adjustment of a sitting platform, such as a driver's seat, if the industrial truck is designed for operation by a seated operator.

Based on the foregoing, it can be seen that the present invention enables the height of a standing and/or sitting arrangement in an industrial truck to be adjusted utilizing hydraulics, and preferably steering hydraulics, already present on the vehicle, and hence at a low cost. Moreover, the present invention enables the height adjustment to be accomplished quickly and simply.

The above invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. An industrial truck comprising:
   a height-adjustable standing and/or sitting arrangement for an operator;
   a hydraulic steering system for steering the industrial truck; and a hydraulic positioning cylinder, wherein:

the standing and/or sitting arrangement is connected to the hydraulic positioning cylinder which is connected to the hydraulic steering system for adjusting the height of the standing and/or sitting arrangement.

2. An industrial truck comprising:

a height-adjustable standing and/or sitting arrangement for an operator;

a hydraulic system;

a hydraulic positioning cylinder, wherein:

the standing and/or sitting arrangement is connected to the hydraulic positioning cylinder which is connected to the hydraulic system for adjusting the height of the standing and/or sitting arrangement; and further including a controller and a switchable valve, wherein:

the hydraulic system is comprised of steering hydraulics having a pump and a steering motor which can be acted upon from both sides to adjust the hydraulic positioning cylinder;

the hydraulic positioning cylinder is connected in parallel with the steering motor; and a switchable valve is disposed in a line which leads from the steering motor to the hydraulic positioning cylinder.

3. The industrial truck according to claim 2, wherein the switchable valve is disposed in the line which leads to a positioning space of the hydraulic positioning cylinder associated with the upward movement of the height adjustment.

4. The industrial truck according to claim 2, wherein:

the switchable valve is comprised of an electromagnetically actuatable directional-control valve having a feedthrough setting and a closed setting; and the switchable valve is controllable by a control unit which is connected to receive input from at least one of a position signal generator for the height adjustment, a control signal generator and a control device for a work function of the industrial truck.

5. The industrial truck according to claim 3, wherein:

the switchable valve is comprised of an electromagnetically actuatable directional-control valve with a feedthrough setting and a closed setting; and the switchable valve may be controlled by a least one control unit which is connected to at least one of a position signal generator for the height adjustment, a control signal generator and a control device for a work function of the industrial truck.

6. The industrial truck according to claim 4, wherein the control unit is connected with the switchable valve, the control signal generator, and the control devices for the work functions such that the control unit (i) prevents the switchable valve from changing to the open position when a control signal for a work function is received thereby from one or both of the control signal generator and the control device in advance of a signal to adjust the height of the standing and/or sitting arrangement, and (ii) prevents a work function from being performed when a signal to adjust the height of the standing and/or sitting arrangement is received thereby in advance of a control signal for a work function from one or both of the control signal generator and the control device.

7. The industrial truck according to claim 2, wherein the pressure in the positioning cylinder required for the height adjustment is less than the pressure applied in the steering motor during steering of the stationary industrial truck and is greater than the pressure applied in the steering motor during steering of the traveling industrial truck.

8. The industrial truck according to claim 7, further including a pressure regulator disposed in the line which leads to a positioning space of the positioning cylinder.

9. The industrial truck according to claim 1, wherein the standing and/or sitting arrangement is designed as a standing platform of an industrial truck which is driven by a standing driver.

10. The industrial truck according to claim 3, wherein the pressure in the positioning cylinder required for the height adjustment is less than the pressure applied in the steering motor during steering of the stationary industrial truck and is greater than the pressure applied in the steering motor during steering of the traveling industrial truck.

11. The industrial truck according to claim 4, wherein the pressure in the positioning cylinder required for the height adjustment is less than the pressure applied in the steering motor during steering of the stationary industrial truck and is greater than the pressure applied in the steering motor during steering of the traveling industrial truck.

12. The industrial truck according to claim 6, wherein the pressure in the positioning cylinder required for the height adjustment is less than the pressure applied in the steering motor during steering of the stationary industrial truck and is greater than the pressure applied in the steering motor during steering of the traveling industrial truck.

13. The industrial truck according to claim 3, wherein the standing and/or sitting arrangement is designed as a standing platform of an industrial truck which is driven by a standing driver.

14. The industrial truck according to claim 4, wherein the standing and/or sitting arrangement is designed as a standing platform of an industrial truck which is driven by a standing driver.

15. The industrial truck according to claim 6, wherein the standing and/or sitting arrangement is designed as a standing platform of an industrial truck which is driven by a standing driver.

16. The industrial truck according to claim 7, wherein the standing and/or sitting arrangement is designed as a standing platform of an industrial truck which is driven by a standing driver.

17. The industrial truck according to claim 8, wherein the standing and/or sitting arrangement is designed as a standing platform of an industrial truck which is driven by a standing driver.

18. An industrial truck comprising:

a driver's cab including a height-adjustable platform for a standing operator positioned in the cab;

a hydraulic steering system for steering the truck, said steering system operable from within said cab; and a hydraulic positioning cylinder coupled to said height adjustable platform for adjusting the height of said platform, and said hydraulic positioning cylinder powered through said hydraulic steering system.

* * * * *